United States Patent [19]
Betensky

[11] 3,883,228
[45] May 13, 1975

[54] VARIABLE MAGNIFICATION ZOOM LENS
[75] Inventor: Ellis I. Betensky, Stamford, Conn.
[73] Assignee: Minnesota Mining and Manufacturing Company, Saint Paul, Minn.
[22] Filed: July 9, 1973
[21] Appl. No.: 377,533

[52] U.S. Cl. ................. 350/184; 350/187; 350/215
[51] Int. Cl. ............................................ G02b 15/00
[58] Field of Search ........... 350/183, 184, 187, 215, 350/221, 220, 255

[56] References Cited
UNITED STATES PATENTS
3,436,145  4/1969  Bechtold ............................. 350/215
3,728,010  4/1973  Mikami ............................... 350/184

Primary Examiner—Ronald L. Wibert
Assistant Examiner—Conrad Clark
Attorney, Agent, or Firm—Alexander, Sell, Steldt & DeLaHunt

[57] ABSTRACT
A zoom lens providing variable magnification in a short fixed object plane to image plane distance in which a lens barrel contains a prime lens and a low power, air-spaced doublet coaxial with and at one end of the prime lens, the doublet combining with the prime lens to provide a plurality of magnifications at the image plane of objects at the object plane upon synchronized movement of the lens barrel and one element of the doublet with respect to the lens barrel and the other elements to a plurality of predetermined correlated positions.

8 Claims, 32 Drawing Figures

| ELEMENT NO. | $N_D$ | $V$ | RADII (m.m.) | THICKNESSES & SPACINGS (m.m.) |
|---|---|---|---|---|
| 1 | 1.613 | 58.6 | $R_1 = +65.6027$<br>$R_2 = -395.000$ | $t_1 = 20.099$<br>$S_1 = 5.270$ |
| 2 | 1.541 | 47.2 | $R_3 = +395.000$<br>$R_4 = +47.90$ | $t_2 = 6.959$ |
| 3 | 1.615 | 51.2 | $R_5 = +108.60$<br>$R_6 = +219.40$ | $t_3 = 7.130$<br>$S_2 = 14.990$<br>$S_3 = 14.985$ |
| 4 | 1.613 | 58.6 | $R_7 = -81.12$<br>$R_8 = -56.91$ | $t_4 = 8.457$<br>$S_4 = 4.470$ |
| 5 | 1.589 | 40.9 | $R_9 = -38.76$<br>$R_{10} = -87.86$ | $t_5 = 5.201$ |
| 6 | 1.589 | 61.3 | $R_{11} = +87.86$<br>$R_{12} = -50.30$ | $t_6 = 18.630$ $S_5 = \begin{cases} 6.325 \text{ at } 1.00 \\ 4.761 \text{ at } 0.77 \\ 1.898 \text{ at } 0.65 \\ 0.400 \text{ at } 0.61 \end{cases}$ |
| 7 | 1.636 | 35.3 | $R_{13} = -256.50$<br>$R_{14} = -80.72$ | $t_7 = 11.000$ $S_6 = \begin{cases} 1.100 \text{ at } 1.00 \\ 2.664 \text{ at } 0.77 \\ 5.527 \text{ at } 0.65 \\ 7.025 \text{ at } 0.61 \end{cases}$ |
| 8 | 1.699 | 30.1 | $R_{15} = -77.72$<br>$R_{16} = -175.85$ | $t_8 = 6.380$ |

| ELEMENT NO. | N | V | RADII (m.m.) | THICKNESSES & SPACINGS (m.m.) |
|---|---|---|---|---|
| 1 | 1.613 | 58.6 | $R_1 = +70.0300$<br>$R_2 = -222.5170$ | $t_1 = 16.500$ |
| 2 | 1.523 | 51.5 | $R_3 = +222.5170$<br>$R_4 = +49.9620$ | $t_2 = 5.000$<br>$S_1 = 6.057$ |
| 3 | 1.613 | 58.6 | $R_5 = +84.2660$<br>$R_6 = +159.8570$ | $t_3 = 7.128$<br>$S_2 = 0$<br>$S_3 = 19.000$ |
| 4 | 1.613 | 58.6 | $R_7 = -95.1100$<br>$R_8 = -67.1470$ | $t_4 = 7.128$<br>$S_4 = 5.029$ |
| 5 | 1.603 | 38.0 | $R_9 = -47.1530$<br>$R_{10} = +156.6650$ | $t_5 = 7.634$ |
| 6 | 1.613 | 58.6 | $R_{11} = -156.6650$<br>$R_{12} = -58.3400$ | $t_6 = 24.283$<br>$S_5 = 2.858$ |
| 7 | 1.613 | 58.6 | $R_{13} = -829.8650$<br>$R_{14} = -110.5590$ | $t_7 = 8.500$<br>$S_6 \begin{cases} 4.469 \text{ at } 1.00 \\ 5.867 \text{ at } 0.77 \\ 8.482 \text{ at } 0.65 \end{cases}$ |
| 8 | 1.613 | 58.6 | $R_{15} = -82.3720$<br>$R_{16} = -321.8210$ | $t_8 = 8.000$ |

VARIABLE MAGNIFICATION ZOOM LENS

FIELD OF THE INVENTION

The present invention relates to a zoom lens providing variable magnification in a fixed object to image plane distance.

BACKGROUND OF THE INVENTION

Photocopier imaging lenses must form images with high contrast at low spatial frequencies to provide acceptable results. In a variable magnification photocopier these conditions must be met by the imaging lens throughout the range of magnifications.

Variable magnification photocopiers in the prior art have generally changed the magnification by moving and rotating a mirror to change the object to image distance and at the same time moving the lens. This is disadvantageous because the lens exhibits its optimum performance at only one magnification and at other magnifications a compromise image must be accepted. Furthermore, in such a system the lens and mirror can only be moved to a limited number of discrete positions in a limited space consistent with the focal length of the lens and the required movement of the lens and mirror to change the magnification requires a relatively long time to accomplish due to the large distance the lens must move.

SUMMARY OF THE INVENTION

The zoom lens of the present invention provides variable magnification in a short, fixed object plane to image plane distance and comprises a lens barrel, a prime lens within said lens barrel, and a low power, air spaced doublet within the lens barrel coaxial with and at one end of the prime lens, one of the elements of the doublet being supported for axial movement with respect to the lens barrel and the other elements. The doublet combines with the prime lens to provide a plurality of magnifications at the image plane of objects at the object plane upon synchronized movement of the lens barrel and the moveable element of the doublet to a plurality of predetermined correlated positions.

A lens constructed in accordance with the present invention achieves a large focal length change upon a very small movement of the moveable lens element thereby permitting an extremely compact lens package. It also provides excellent imaging for photocopying at all magnifications.

DESCRIPTION OF THE PREFERRED EMBODIMENTS

Figure 1:
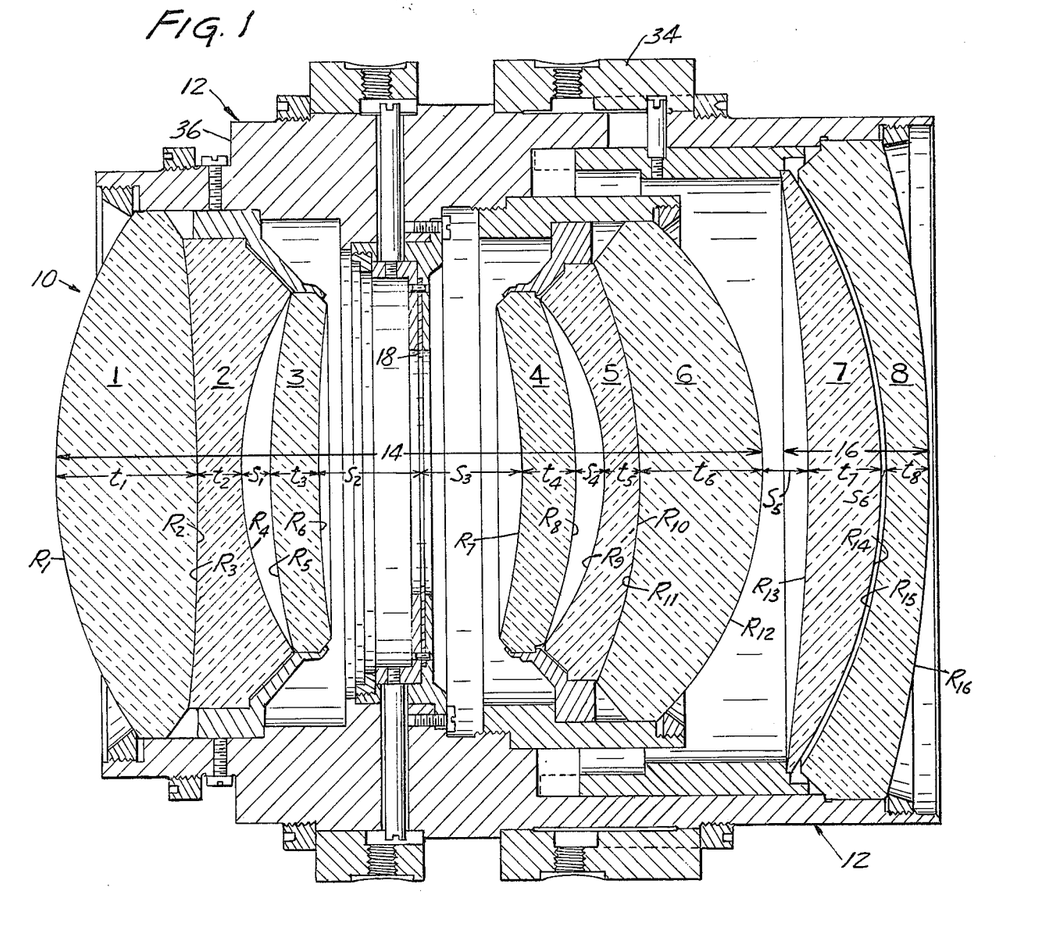
FIG. 1 is a longitudinal cross-sectional view of a zoom lens constructed in accordance with the present invention.

FIG. 1 illustrates the type of lens elements and their arrangement in both embodiments of the zoom lens of the present invention described herein. The zoom lens, generally designated 10, comprises a lens barrel 12, a prime lens 14 within the lens barrel and a low power, air spaced doublet 16 within the lens barrel coaxial with and at one end of the prime lens 14. In the illustrated embodiments the prime lens 14 is a six element Plasmat type lens comprising from front to rear a double positive lens element 1, a double negative lens element 2, a positive meniscus lens element 3, a second positive meniscus lens element 4, a negative meniscus lens element 5 and a third positive meniscus lens element 6. The doublet 16 is behind the prime lens 14 and comprises a positive meniscus lens element 7 adjacent the prime lens 14 and a negative meniscus lens element 8. A variable apperture diaphragm 18 is positioned between lens elements 3 and 4.

Figure 2:
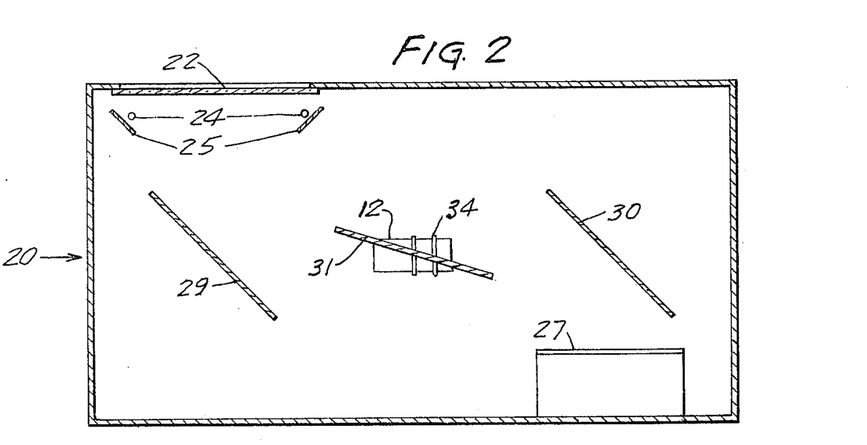
FIG. 2 is a longitudinal cross-sectional view schematically illustrating the zoom lens of FIG. 1 in a photocopier.

The zoom lens 10 is illustrated in FIG. 2 in its intended use in a photocopier 20 having a transparent platen 22 defining the fixed object plane for supporting an original document to be copied. Flash lamps 24 and reflectors 25 provide illumination of an original document on the platen 22, the image of which is focused on an intermediate sheet 27 by the zoom lens in conjunction with a pair of stationary mirrors 29 and 30. Original documents of varying sizes are centered on one transverse edge of the platen 22 for reproduction at the same size or at a selected reduced size.

The lens barrel 12 is supported on guide tracks 31 running parallel to the length of the platen 22 to guide the lens 10 along a path having an axial and a vertical component. The guide tracks 31 include two cam surfaces (not shown) one of which is engaged by a first cam follower that adjusts the aperture of the diaphragm to maintain a constant illumination level at the image plane. A second cam follower engages the other cam surface to move one of the elements of the doublet 16 axially with respect to the lens barrel 12 and the other elements in synchronization with axial movement of the entire lens 10 to vary the magnification of the images focused at the image plane. The lens 10 is moved vertically as well as axially to maintain the intersection of its axis with the platen 22 approximately at the center of the original document being copied, larger documents of course extending further from the transverse alignment edge of the platen 22.

Figure 3:
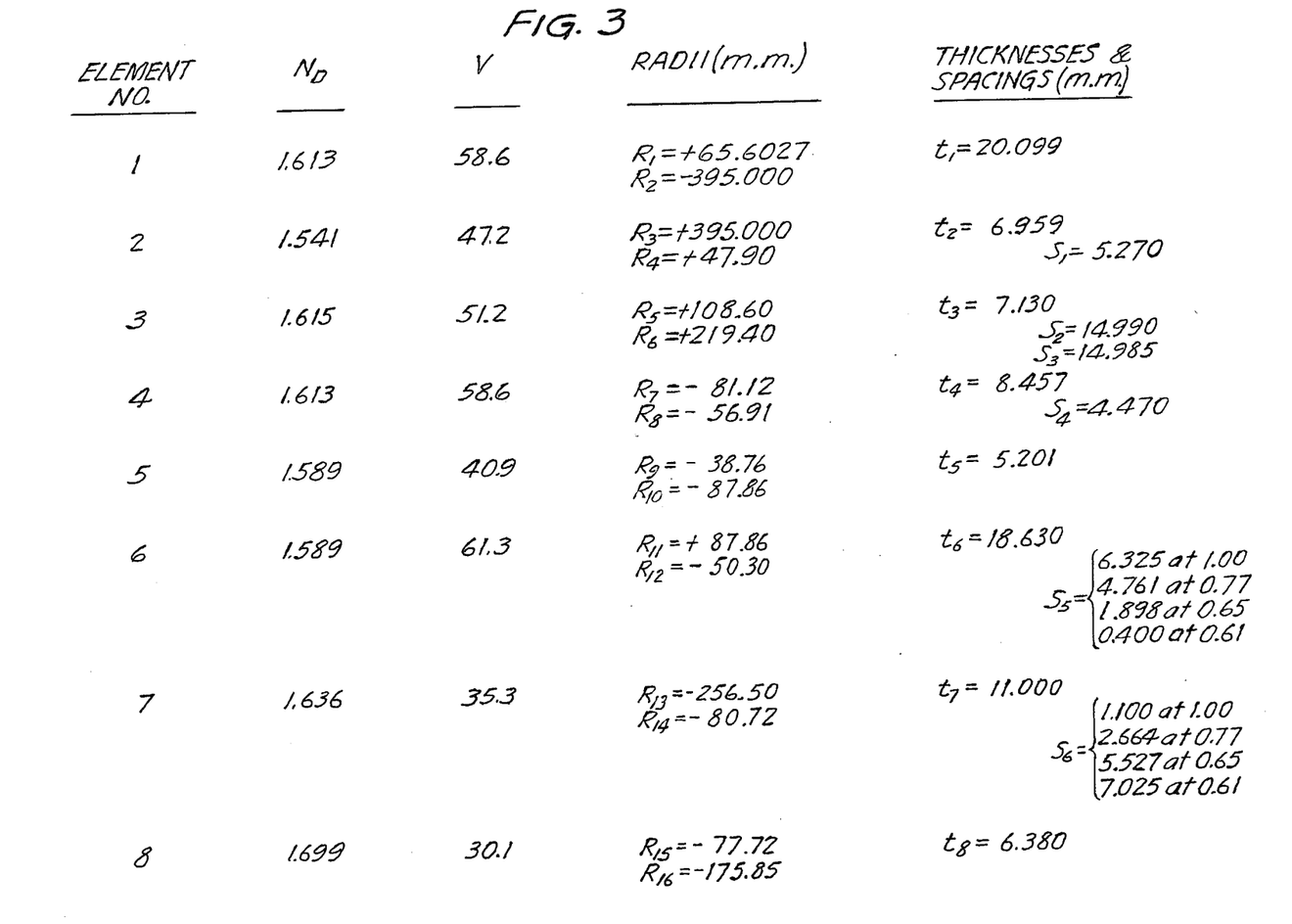
FIG. 3 is a table of the characteristics and spatial relations of the lens elements of a first embodiment of the present invention.
Figure 4A:
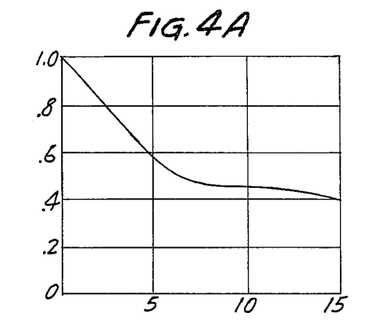
FIGS. 4, 5, 6 and 7 are calculated polychromatic modulation transfer function curves for the lens constructed in accordance with the table of FIG. 3 at selected magnifications of the lens.
Figure 4B:
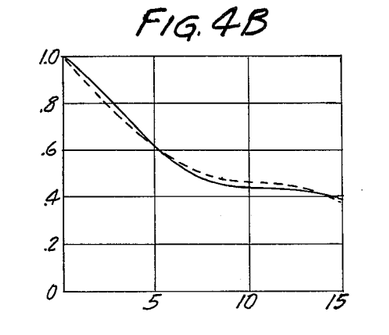
Figure 4C:
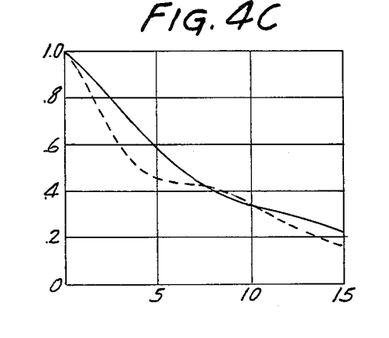
Figure 4D:
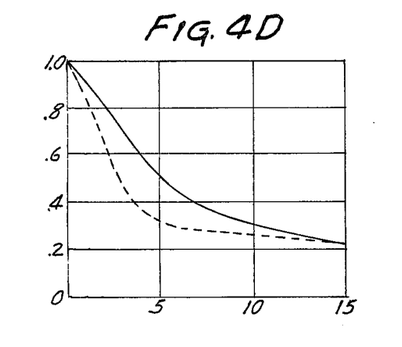
Figure 5A:
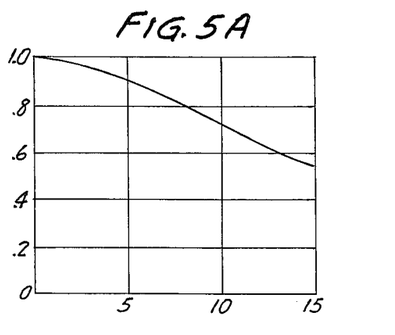
Figure 5B:
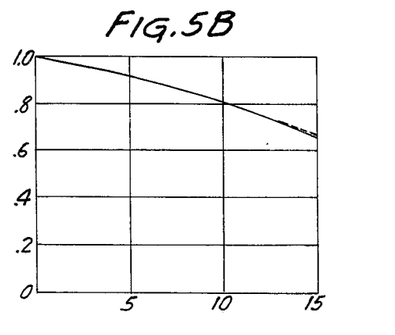
Figure 5C:
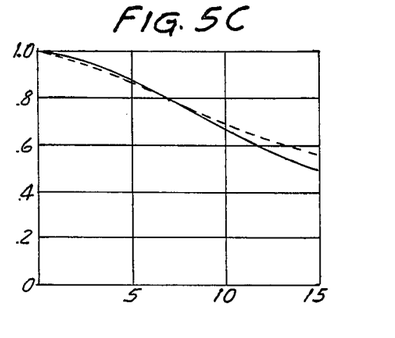
Figure 5D:
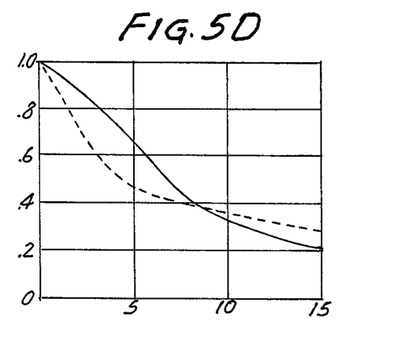
Figure 6A:
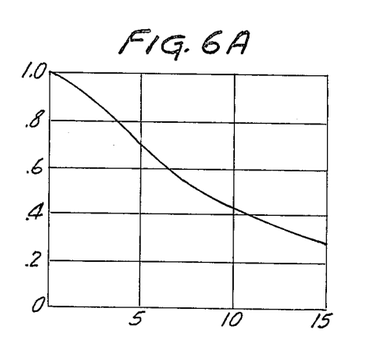
Figure 6B:
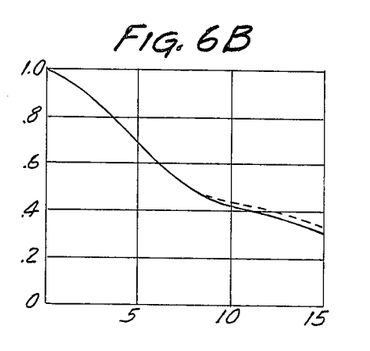
Figure 6C:
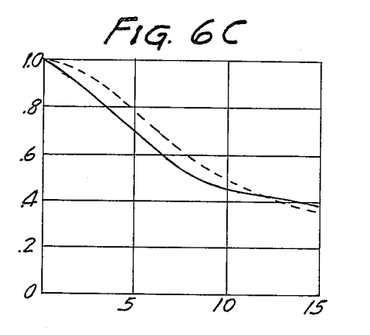
Figure 6D:
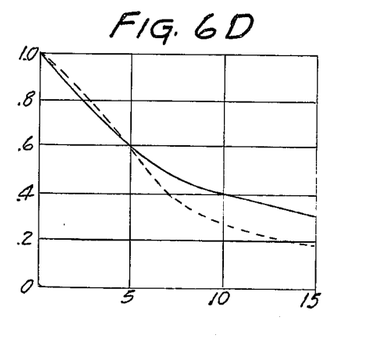
Figure 7A:
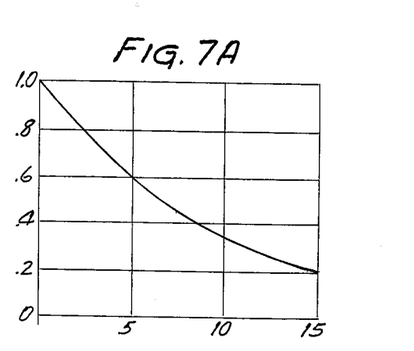
Figure 7B:
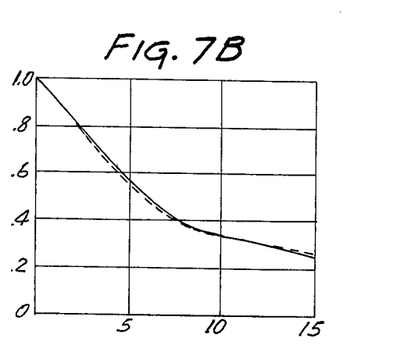
Figure 7C:
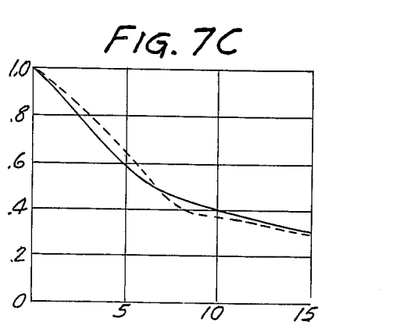
Figure 7D:
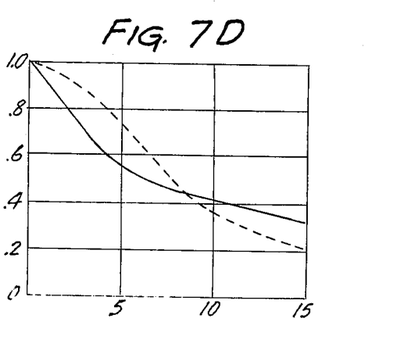

The exact structure and mounting of the lens elements illustrated in FIG. 1 illustrates the first embodiment of the zoom lens of the present invention, the constructional details of which are set forth in the table of FIG. 3. In FIG. 3 the lens elements are numbered from front to rear, $N$ is the index of refraction of the lens elements for the D line, $V$ is the Abbe number, and $R$, $T$ and $S$ refer, respectively, to the radii of curvature of the lens surfaces, the thickness of the lens elements and the air spaces between the elements, numbered by subscript from front to rear. This lens is designed for a fixed object plane to image plane distance of 1,024.98 millimeters.

In the first embodiment the seventh lens element is supported for movement with respect to the lens barrel 12 and the other elements by a camming ring 34 which is rotated by the cam surface associated with the guide tracks 31 in synchronization with movement of the lens 10 along the guide tracks. It is preferable as in this embodiment, to move the inner element of the doublet 16 since the volume of air in the lens system is thereby held constant as the magnification is varied. The variable spacings 5 and 6 specified in FIG. 3 define the position of movable lens element 7 at four magnifications; 1.00, 0.77, 0.65 and 0.61. The reduction magnification of 0.77 reduces a legal size 11 inch by 14 inch document to fit 8.5 inch by 11 inch copy paper; the reduction magnification of 0.65 reduces a B size engineering drawing to fit 8.5 inch by 11 inch copy paper; and the reduction magnification of 0.61 reduces a 14 inch by 18 inch document such as some accounting ledger sheets to fit 8.5 inch by 11 inch copy paper. At the 1.00 magnification the correlated position of the lens 10 is spaced a distance of 565.30 millimeters from the image plane (measured from a mounting flange 36 on the lens barrel 12) and its effective focal length is 257.87 millimeters; at the 0.77 magnification the correlated lens spacing is 496.53 millimeters and its effective focal length is 253.65 millimeters; at the 0.65 magnification the correlated lens spacing is 451.08 millimeters and its effective focal length is 246.22; and, at the 0.61 magnification the correlated lens spacing is 434.61 millimeters and its effective focal length is 242.52 millimeters.

FIGS. 4 through 7 are calculated polychromatic modulation transfer function curves for the first embodiment at magnifications of 1.00, 0.77, 0.65 and 0.61, respectively. In the graphs of FIGS. 4 through 7 the abscissa is the spacial frequency in cycles per millimeter and the ordinate is the modulation which is unitless; and, the full lines represent the tangential ray modulation transfer function traces and the broken lines represent the sagittal ray modulation transfer function traces for the lens. FIGS. 4a, 5a, 6a and 7a are traces on axis; FIGS. 4b, 5b, 6b and 7b are traces at one-third of the field of view of the lens, FIGS. 4c, 5c, 6c and 7c are traces at two-thirds of the field of view of the lens, and FIGS. 4d, 5d, 6d and 7d are traces at the full field of view of the lens. The fact that the tangential ray and sagittal ray traces are close together shows that the lens is very well corrected for astigmatism. Furthermore, from these graphs it can be seen that the contrast at 10 cycles per millimeter is high thereby demonstrating that it is an excellent lens for photocopying.

Figure 8:
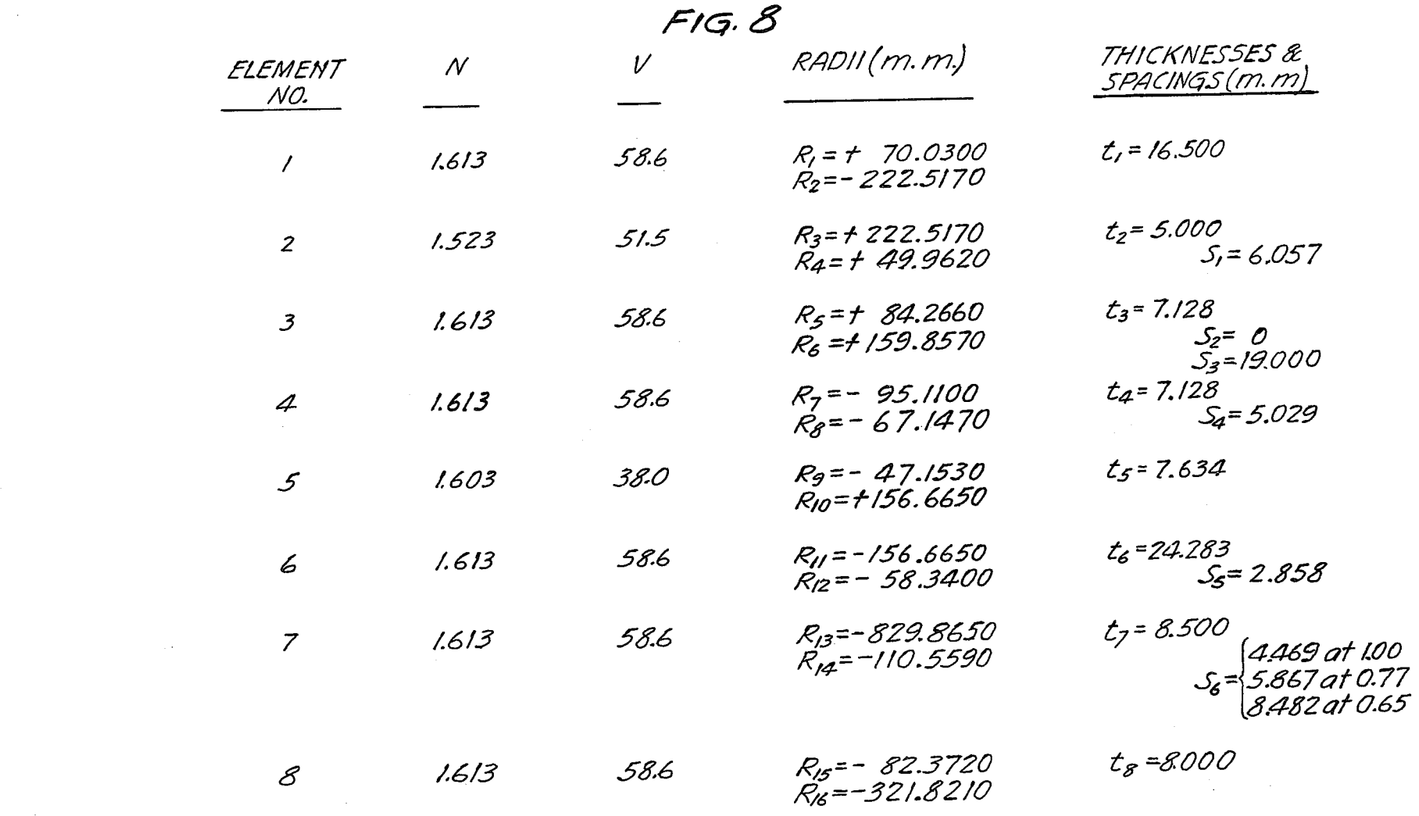
FIG. 8 is a table of the characteristics and spatial relations of the lens elements of a second embodiment of the present invention.
Figure 9A:
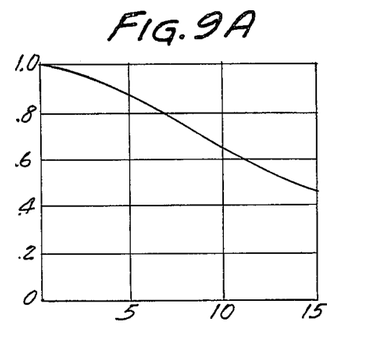
FIGS. 9, 10 and 11 are calculated polychromatic modulation transfer function curves for the lens constructed in accordance with the table of FIG. 8 at three different magnifications.
Figure 9B:
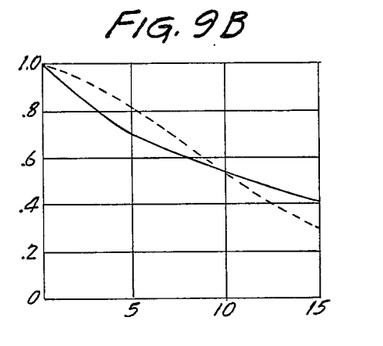
Figure 9C:
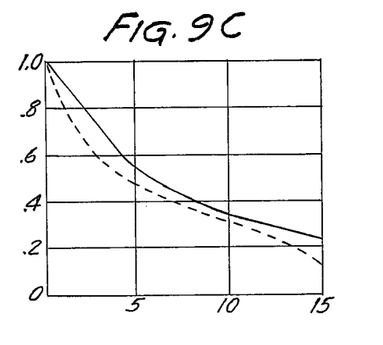
Figure 9D:
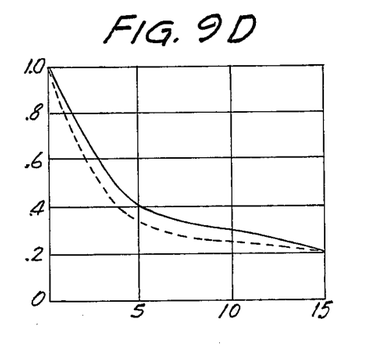
Figure 10A:
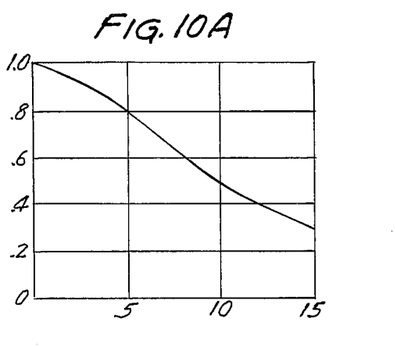
Figure 10B:
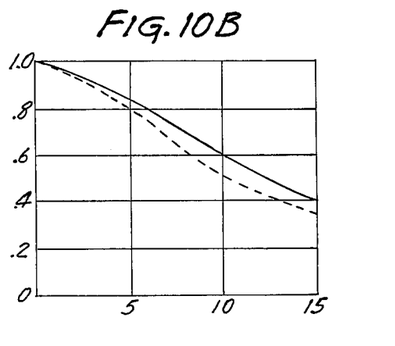
Figure 10C:
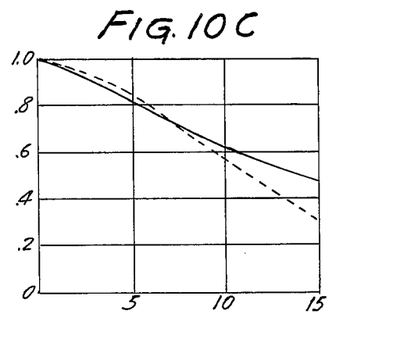
Figure 10D:
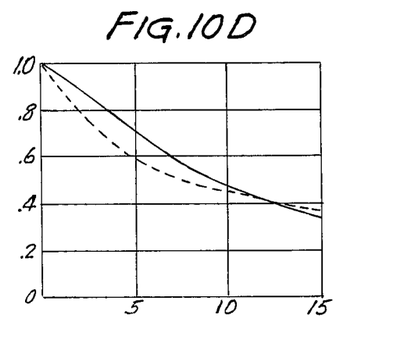
Figure 11A:
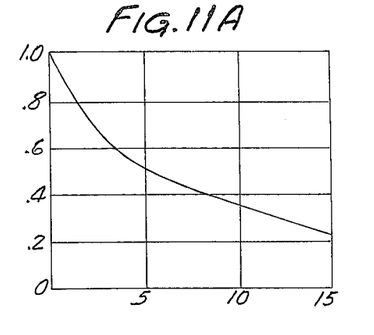
Figure 11B:
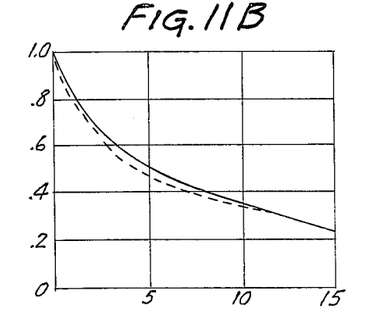
Figure 11C:
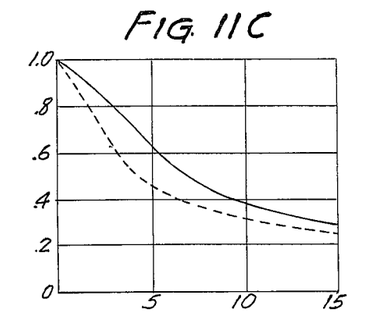
Figure 11D:
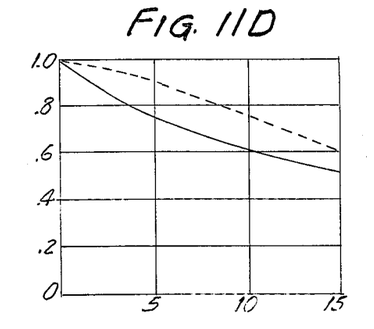

Numerical data for constructing the second embodiment of the present invention is given in the table of FIG. 8 in which the lens elements are numbered from front to rear, $N$ is the index of refraction of the lens elements for the D line, $V$ is the Abbe number, and $R$, $T$ and $S$ refer respectively, to the radii of curvature of the lens surfaces, the thickness of the lens elements and the air spaces between the elements, numbered by subscript from front to rear. This lens is designed for a fixed object plane to image plane distance of 1016.63 millimeters.

In this second embodiment, in contrast to the first, the eighth lens element is supported for movement with respect to the lens barrel 12 and the other elements. It is, however, preferably supported and moved in the same manner as the movable seventh element in the first embodiment. The variable spacing 6 as specified in FIG. 8 defines the position of movable lens element 8 at three magnifications; 1.00, 0.77 and 0.65. At the 1.00 magnification the correlated position of the lens 10 is spaced a distance of 565.30 millimeters from the image plane (measured from the mounting flange 36 on the lens barrel 12) and its effective focal length is 252.008 millimeters; at the 0.77 magnification the correlated lens spacing is 632.57 millimeters and its effective focal length is 247.904 millimeters; and, at the 0.65 magnification the correlated lens spacing is 675.957 millimeters and its effective focal length is 240.576 millimeters.

FIGS. 9, 10 and 11 are calculated polychromatic modulation transfer function curves for the second embodiment of the zoom lens of the present invention at magnifications of 1.00, 0.77 and 0.65, respectively. These curves are set up in the same manner as the curves of FIGS. 4 through 7; FIGS. 9a, 10a and 11a comprising traces on axis, FIGS. 9b, 10b and 11b comprising traces at one-third of the field of view of the lens, FIGS. 9c, 10c and 11c comprising traces at two-thirds of the field of view of the lens, and FIGS. 9d, 10d and 11d comprising traces at the full field of view of the lens. Again, the fact that the tangential ray and sagittal ray traces are close together shows that the lens is very well corrected for astigmatism. And, the fact that the contrast is high at 10 cycles per millimeter demonstrates that this lens is also excellent for photocopying.

I claim:

1. An asymmetrical zoom lens providing variable magnification in a short, fixed object plane to image plane distance, comprising:
   a lens barrel,
   a prime lens within said lens barrel, and
   a lower power, air spaced doublet within said lens barrel coaxial with and at one end of said prime lens, one of the elements of said doublet being supported for axial movement with respect to said lens barrel and the other elements, said doublet combining with said prime lens to provide a plurality of magnifications at the image plane of objects at the object plane upon synchronized movement of said lens barrel and said movable element of said doublet to a plurality of predetermined correlated positions.

2. The zoom lens of claim 1 including means for moving said lens barrel to said plurality of predetermined positions, and means for moving said one element of said doublet axially with respect to said lens barrel and the other elements to said plurality of predetermined positions in correlation with movement of said lens barrel.

3. The zoom lens of claim 1 wherein said doublet is behind said prime lens with respect to light progressing from the object plane to the image plane.

4. The zoom lens of claim 3 wherein said doublet comprises a positive meniscus lens element adjacent said prime lens and a negative meniscus lens element.

5. The zoom lens of claim 4 wherein said prime lens is a six element lens comprising from front to rear a double positive lens element, a double negative lens element, a positive meniscus lens element, a second positive meniscus lens element, a negative meniscus lens element and a third positive meniscus lens element.

6. The zoom lens of claim 1 wherein the element of said doublet closest to said prime lens is supported for said axial movement.

7. The zoom lens of claim 1 wherein said doublet is behind said prime lens with respect to light progressing from the object plane to the image plane, the element of said doublet closest to said prime lens is supported for said axial movement, and wherein the lens elements have substantially the following characteristics and spatial relations in which the lens elements are numbered from the front, $N$ is the index of refraction for the D line, $V$ is the Abbe number, and $R$, $T$ and $S$ refer, respectively, to the radii of curvature of the lens surfaces, the axial thickness of the lens elements, and the axial spacing between the lens elements, numbered by subscript from front to rear:

| ELEMENT NO. | $N_D$ | $V$ | RADII(m.m.) | THICKNESSES & SPACINGS(m.m.) |
|---|---|---|---|---|
| 1 | 1.613 | 58.6 | $R_1$=+65.6027<br>$R_2$=−395.000 | $t_1$=20.099 |
| 2 | 1.541 | 47.2 | $R_3$=+395.000<br>$R_4$=+47.90 | $t_2$=6.959<br>$S_1$=5.270 |
| 3 | 1.615 | 51.2 | $R_5$=+108.60<br>$R_6$=+219.40 | $t_3$=7.130<br>$S_2$=14.990<br>$S_3$=14.985 |
| 4 | 1.613 | 58.6 | $R_7$= −81.12<br>$R_8$= −56.91 | $t_4$=8.457<br>$S_4$=4.470 |
| 5 | 1.589 | 40.9 | $R_9$= −38.76<br>$R_{10}$=−87.86 | $t_5$=5.201 |
| 6 | 1.589 | 61.3 | $R_{11}$=+87.86<br>$R_{12}$=−50.30 | $t_6$=18.630<br>$S_5 = \begin{cases} 6.325 \text{ at } 1.00 \\ 4.761 \text{ at } 0.77 \\ 1.898 \text{ at } 0.65 \\ 0.400 \text{ at } 0.61 \end{cases}$ |
| 7 | 1.636 | 35.3 | $R_{13}$=−256.50<br>$R_{14}$= −80.72 | $t_7$= 11.000<br>$S_6 = \begin{cases} 1.100 \text{ at } 1.00 \\ 2.664 \text{ at } 0.77 \\ 5.527 \text{ at } 0.65 \\ 7.025 \text{ at } 0.61 \end{cases}$ |
| 8 | 1.699 | 30.1 | $R_{15}$= −77.72<br>$R_{16}$=−175.85. | $t_8$=6.380 |

8. The zoom lens of claim 1 wherein said doublet is behind said prime lens with respect to light progressing from the object plane to the image plane, the element of said doublet farthest removed from said prime lens is supported for said axial movement and wherein the lens elements have substantially the following characteristics and spatial relations in which the lens elements are numbered from the front, $N$ is the index of refraction for the D line, $V$ is the Abbe number, and $R$, $T$ and $S$ refer, respectively, to the radii of curvature of the lens surfaces, the axial thickness of the lens elements, and the axial spacing between the lens elements, numbered by subscript from front to rear:

| ELEMENT NO. | $N$ | $V$ | RADII(m.m.) | THICKNESSES & SPACINGS(m.m.) |
|---|---|---|---|---|
| 1 | 1.613 | 58.6 | $R_1$= + 70.0300<br>$R_2$=−222.5170 | $t_1$=16.500 |
| 2 | 1.523 | 51.5 | $R_3$=+222.5170<br>$R_4$= + 49.9620 | $t_2$= 5.000<br>$S_1$=6.057 |
| 3 | 1.613 | 58.6 | $R_5$= + 84.2660<br>$R_6$=+159.8570 | $t_3$= 7.128<br>$S_2$= 0<br>$S_3$=19.000 |
| 4 | 1.613 | 58.6 | $R_7$= − 95.1100<br>$R_8$= − 67.1470 | $t_4$= 7.128<br>$S_4$=5.029 |
| 5 | 1.603 | 38.0 | $R_9$= − 47.1530<br>$R_{10}$=+156.6650 | $t_5$= 7.634 |
| 6 | 1.613 | 58.6 | $R_{11}$=−156.6650<br>$R_{12}$=482 − 58.3400 | $t_6$=24.283<br>$S_5$=2.858 |
| 7 | 1.613 | 58.6 | $R_{13}$=−829.8650<br>$R_{14}$=−110.5590 | $t_7$= 8.500<br>$S_6 = \begin{cases} 4.469 \text{ at } 1.00 \\ 5.867 \text{ at } 0.77 \\ 8.482 \text{ at } 0.65 \end{cases}$ |
| 8 | 1.613 | 58.6 | $R_{15}$=− 82.3720<br>$R_{16}$=−321.8210. | $t_8$= 8.000 |

* * * * *